Aug. 9, 1949.         J. S. DOWNS              2,478,811
                  POWER OPERATED GATE VALVE
Filed May 19, 1947                        2 Sheets-Sheet 1
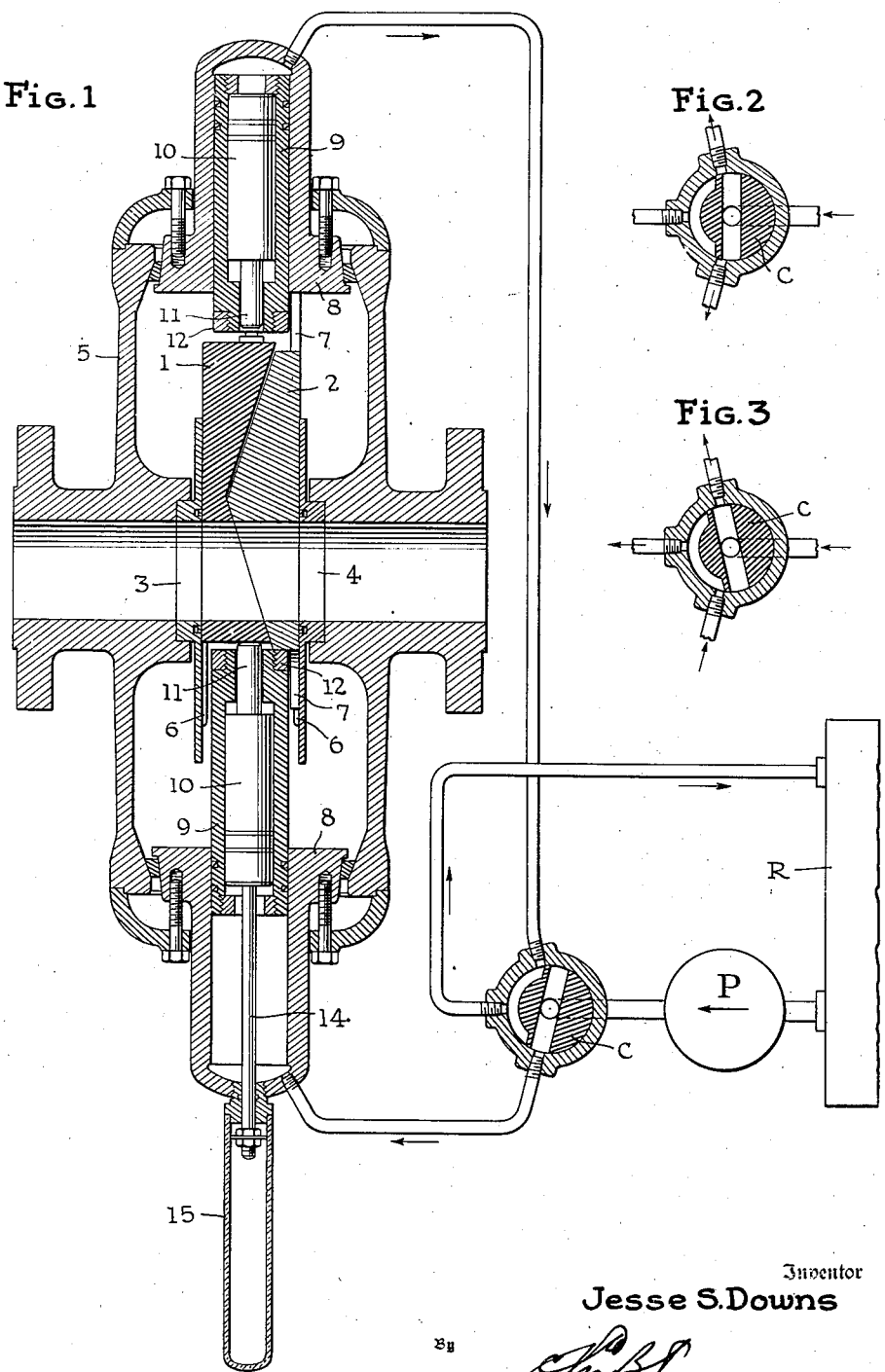
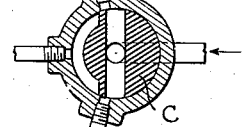
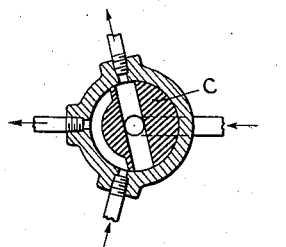
Inventor
Jesse S. Downs
By
Attorney Aug. 9, 1949.   J. S. DOWNS   2,478,811
POWER OPERATED GATE VALVE
Filed May 19, 1947   2 Sheets-Sheet 2
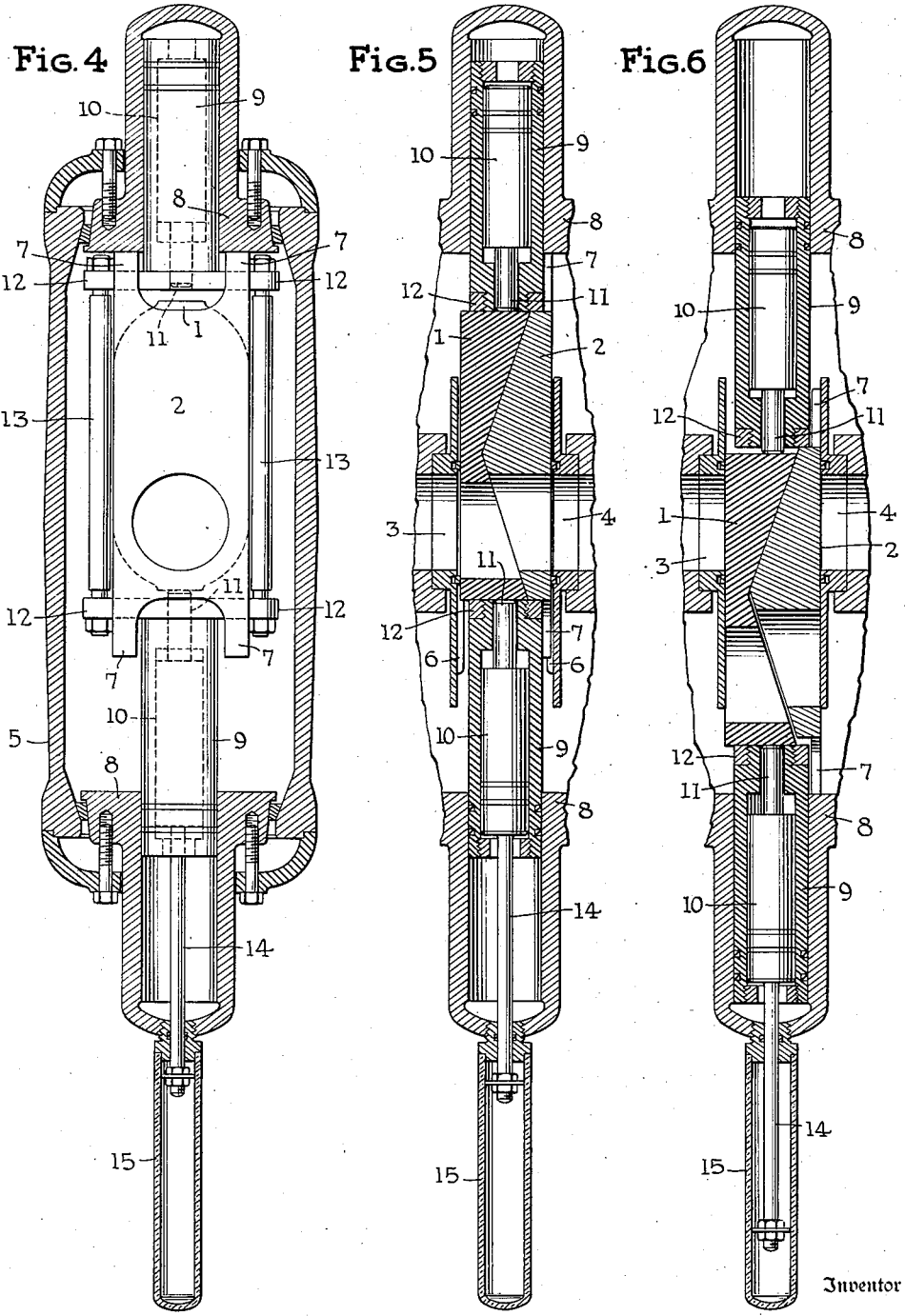
Inventor
Jesse S. Downs
By
Attorney Patented Aug. 9, 1949

2,478,811

UNITED STATES PATENT OFFICE 2,478,811

POWER-OPERATED GATE VALVE

Jesse S. Downs, Almeda, Tex., assignor to W-K-M Company, Inc., Houston, Tex., a corporation of Texas Application May 19, 1947, Serial No. 748,923

12 Claims. (Cl. 137—139)

This invention relates to valves of the "through-conduit" gate type, intended primarily for controlling the flow of fluids in the larger size conduits and pipes in which the fluid pressure, in the line to be controlled, may be as high as 10,000–15,000 pounds per square inch. These pipe lines and conduits vary in size from 2" to 30" in diameter. Manual operation, particularly of the larger size control valves in pipe lines and conduits in which the fluid pressure is of such high order, has been found to be both difficult and hazardous; and, the problem of the art, solved by the present invention, has been to provide a safe and certain means, for the operation of valves in these high pressure lines which handle, notably, hydrocarbon gas and oil, in production, distribution, and in distribution manifolds for the handling of these fluids. By "through-conduit" valve is intended one which in open position leaves the conduit entirely unobstructed at the valve opening.

It is an object of this invention then to provide a combined valve and associated fluid pressure means for positively operating the valve into its open and closed positions; to provide such fluid pressure means that can be remotely controlled; and to provide a fluid pressure operating means so designed and proportioned that the valve can be positively moved to either its open or closed position regardless of the existing fluid pressure in the pipe or conduit in which the valve is located.

It is a further object of this invention to provide a valve and its operating mechanism which is completely enclosed, i. e., with no operating parts extending beyond or through the walls of the valve enclosure. This feature eliminates the use of packing glands, and thereby avoids the friction loads, which are excessive, particularly in large valves, where the operating means is external of the valve housing.

A further object of this invention is to provide a valve operating means which exerts its force to move the valve by a pushing force, rather than by pulling the parts to be moved. Thus the valve parts are relieved of destructive tension strains, and breakage of said parts is minimized. Also lighter weight valve parts can be used.

A still further object of the present invention is to provide a valve and its operating means enclosed within a common housing, with the moving parts in balance with respect to the fluid pressure obtaining within the housing.

Still another object of this invention is the provision of engagement between the operating elements and the valve that will positively produce an initial relative movement between the two gate valve segments, in order to effect collapsing of the valve segments to their smallest lateral dimension, and to thereby reduce friction wear on the valve and seats during the major part of the valve movements.

Another and important advance in the art achieved by this invention is a structure which obviates the use of all springs in the valve assembly, as well as in the valve operating means.

These and other objects of this invention will be apparent to those skilled in the art by the following specification, when read in the light of the accompanying drawings which form a part thereof, and in which:

Figure 1 is a sectional elevation, showing the assembled valve and operating means, all enclosed within a housing, together with a diagrammatic illustration of an appropriate remote fluid pressure control for actuating the operating means.

Figures 2 and 3 are views of the control valve C of Figure 1, in which this valve occupies different positions to which it is moved, in controlling the operation of the valve.

Figure 4 is a view, in vertical section, of the structure of Figure 1, Figure 4 being taken on a vertical section at 90° from the section angle of Figure 1, and showing the yoke or harness connecting the oppositely-disposed valve operating pistons.

Figure 5 is a vertical section showing the valve and operating means in the initial stage of the valve closing operation. In this view, the gate segments have been moved relatively to a point where these parts are in the collapsed position and having a minimum lateral dimension. Obviously, this relative position of the valve parts also may be said to show the valve as it moves toward the end of the movement from the closed to the open position.

Figure 6 shows the valve in its closed position with the gate valve segments expanded to affect sealing engagement with the valve seats.

Referring to Figure 1, the illustrated valve per se, in its essential parts, is structurally like that shown in the U. S. patent to M. P. Laurent, Reissue 20,101, of September 8, 1936, at least to the extent that the gate comprises two double taper, relatively movable and expansible segments 1 and 2, which herein will be referred to as the gate 1 and segment 2. The abutting faces of the gate and segment diverge in both directions from a middle point, and accordingly, in their relative movement from a centered or collapsed position there results a wedging action that is effective to expand the valve parts to seal the valve, in both the open and closed positions.

The gate and segment, when assembled, are substantially rectangular in a horizontal section, but obviously may be of circular or other suitable section. The valve seats 3 and 4 have extensions which project into the interior of the valve housing at both sides of the conduit openings, and these extensions together with their integral side flanges 6 serve to guide the movements of the valve and confine it to substantially rectilinear movement. The segment 2, at either end, has a pair of integral projections or lugs 7 (shown more clearly in Figure 4) which are designed to stop the movement of the segment at both ends of its travel. As shown at Figure 1, these lugs 7 have contacted a fixed abutment which latter (one at either end) constitutes a sealed end closure for the housing 5. These end closures 8 additionally serve, each as a cylinder for the outer one of two concentrically arranged pistons that constitute the fluid pressure operating means for the valve. These double-piston fluid motors are arranged one at each end of the valve housing, and are in axial alinement. Since they are alike in construction and operation, a description of one of them will suffice.

The outer piston 9 is cored or bored to form a cylinder for the reception of an inner piston 10 which is of smaller diameter than the outer piston. The ratio of cross-section areas of these two pistons is approximately 3 to 1, that is, the cross-section area of the larger piston should be, roughly 3 times that of the smaller one. The outer piston 9 is of a diameter, at the lower end, as viewed in Figure 1, sufficiently large so that it can engage, at the same time, both the gate 1 and the segment 2. At the valve engaging end, the pistons 9 are bored to provide an axial opening in which the reduced end 11 of the inner piston 10 can slide, with a snug fit, in order to enable the inner piston 10 to engage and move the gate 1 relative to the segment 2 when the latter is positively stopped at an end of its permissible travel. Each piston element 9 is open at the end remote from the valve-engaging end, in order to admit operating fluid pressure to be effective to move the inner piston 10 when fluid pressure is admitted to the closed end of the cylinder formed in the end closure 8.

The two pistons 9 are connected together for movement, in unison. This connection comprises a yoke or frame structure, best shown at Figure 4. Secured rigidly to each piston, at its valve-engaging end, is a cross-head or bar 12, the width of which is shown in Figure 1, and its length in Figure 4. The length of the cross-head 12 is such that it extends beyond the gate and segment elements of the valve (Figure 4), and the heads 12 at or near their outer ends are connected together by the tie rods or bolts 13. This yoke connection is provided with a limited lost motion between the heads 12 and bolts 13, e. g. by reducing the ends of the bolts or rods where they engage with and are secured by nuts to the heads 12. The extent of this lost motion and its function will be apparent from an explanation of the operation of the valve, to be presently made. Since the two opposed pistons are thus connected, it will be understood that any fluid pressure existing within the housing will be prevented from moving the pistons outwardly in opposite directions, at least beyond the extent of the lost motion in the connecting means 12—13. In a certain sense, the valve elements (gate 1 and segment 2) may be said to float in their guides, since neither is rigidly connected with the operating means.

With the valve and its operating means completely enclosed, some means is desirable to indicate, from the outside, the position of the valve, i. e. whether it is in the open or closed position, or in some intermediate position in either direction of its movement. A convenient form of indicator for this purpose is illustrated, e. g., in Figure 1. At either end of the housing, a threaded fitting or nipple forms a guide for a slender indicator rod 14, the inner end of which rod is secured to and moves with the inner piston 10. The extent of projection of the rod from end closure 8 will serve to indicate the position of the valve. If desired, a transparent glass or plastic capsule enclosure may be secured to the nipple fitting to house the projecting end of the rod 14. Other suitable forms of valve position indicator may be used. For example, the fluid pressure control valve may be provided with a dial in association with the operating handle, to indicate, by the position of the latter, whether the valve, in response to fluid operating pressure, is either open or closed.

It is regarded as an important feature of this invention that the valve and its operating mechanism are normally in a state of balance within the housing. The fluid pressure obtaining within the housing is substantially that of the line, but since the operating pistons are connected together, are oppositely disposed, and are of the same effective area there is no force resulting from the internal pressure which tends to produce movement of the valve. Accordingly, the valve will have no tendency to move from any position to which it has been moved. This is true whether the valve is positioned vertically as shown in Figure 1, or in a horizontal position as when the valve and housing is turned 90° from the position of Figure 1. The valve is equally operative in any angular position, with reference to the vertical.

The control for the fluid pressure operating means will now be described. Figure 1 of the drawing illustrates, in diagram, one such means. It is to be understood, however, that the control, as illustrated, is by way of example, to meet the statutory requirements for showing of a complete and operable embodiment of the invention. The illustrated control is applied to a single valve, but obviously a remote control can be designed to operate any number of valves which embody this invention, in any desired order or sequence.

As illustrated, a fluid medium, e. g. oil, is made available at a suitable working pressure, by a pump P. The oil is withdrawn from a reservoir R by the pump and is delivered at a predetermined pressure to a control valve C, which as shown is of the turning plug type. As shown, the valve C has a central inlet in communication with a radial passage which extends transversely through the plug from side to side thereof.

*Operation*

As illustrated in Figure 1, fluid pressure has been admitted to the cylinders at the lower end of Figure 1, and the pistons have operated to move the valve into the full open position. Also the gate 1 and segment 2 have been expanded by wedge action, to effect sealing engagement with their respective seats 3 and 4. With the control valve in the position of Figure 1, the two upper cylinders in which the pistons 9 and 10 operate are in communication through the control valve with reservoir R, in order that the fluid displaced by the upward movement of the pistons is returned to the reservoir R, which may be at atmospheric pressure.

In the control valve position, shown at Figure 2, the valve plug is in an intermediate or transitory position while being operated from the position of Figure 1 in order to move the gate valve to the closed position of Figure 6. In the valve position of Figure 2, fluid pressure is being admitted, temporarily to the valve operating cylinders at both ends of Figure 1. The advantage of this transitory and opposing application of the fluid pressure will be presently made clear. It is intended to change the relative positions of the gate and segment from that shown in Figure 1, to that of Figure 5. During the short interval of time that this opposing application of fluid pressure exists, neither of the opposing cylinders is connected with the reservoir R.

In the valve position of Figure 3, fluid pressure is being admitted to the cylinder at the top of Figure 1, and the bottom cylinder is connected with the reservoir R. The valve setting of Figure 3 will effect movement of the gate and segment to the closed position as shown in Figure 6.

In operating the gate valve from the position of Figure 1, to that of Figure 6 (from open to closed position), the control valve C, as above explained, will first be operated to admit fluid pressure to both of the opposing cylinders. The larger piston 9, at the lower end as viewed in Figure 1, cannot move further upwardly because it is in contact with the end of segment 2 and the opposite end lugs 7 of the latter are in contact with the fixed abutment 8. However, the smaller inner companion piston 10 is urged against the gate 1, but its effective force to move the gate is less than that exerted by the two opposed pistons 9 and 10 which exert their combined force on the opposite end of the gate 1. Consequently while the segment 2 is held against movement by one of the larger pistons 9, the gate 1 is moved relative thereto until gate and segment have reached the relative positions shown at Figure 5. With the gate and segment in this collapsed position (Figure 5), the control valve C is operated from the position of Figure 2, to that of Figure 3, in which position the lower cylinder 8 is connected to reservoir R. The gate and segment will now be pushed toward the position of Figure 6. The segment 2 will first be stopped in the position of Figure 6 when its lower end lugs 7 come in contact with the fixed abutment 8. Thereupon the inner piston 10 will continue to push the gate 1, which by its wedging engagement with the segment 2 will effect expansion of the gate and will thereby effectively seal the gate and segment against the seats 3 and 4.

In the opening of the valve, the operations just described will take place in the same sequence, namely the segment 2 will be positively held until the gate 1 has been moved out of its wedged engagement with the segment 2. Then the gate and segment, in collapsed condition, move together until the segment is stopped, while the gate continues to move into wedged engagement with the segment.

It is to be noted that the gate valve is sealed in both its open and closed positions by positive movement effected by the fluid pressure operating means. When the wedging pressure between the gate and segment is relieved, these elements are centered (Figure 5), and their combined overall lateral dimension is reduced to such an extent that their frictional engagement with the seats and guides is practically eliminated. This serves to minimize wear on both the valve and the valve seats and materially reduces the operating load, i. e. the power required to operate the valve from one to another position.

During the time of the collapsing of the valve elements, the operating pistons at one end move a short distance toward the opposed pistons. This relative movement between the pistons is permitted by the provision of sufficient lost motion in their connecting yoke. The extent or amount of this lost motion is preferably somewhat greater than the endwise displacement of the gate 1 as it moves relative to the segment 2 in effecting the sealing of the valve in either the opening or closing movement.

Having now described and illustrated one completely operable embodiment of my invention, what I claim is:

1. A valve of the "through conduit" gate type with fluid pressure means for operating the valve to its open and closed positions, the combination comprising: a pair of double-tapered sliding gate elements that are displaceable in a direction normal to that of their sliding movement by relative endwise movement in order to effect sealing engagement with the valve seats in both the open and closed positions of the valve; a valve housing which completely encloses the valve and its operating means; the said operating means comprising opposed fluid operated pistons in opposite ends of the housing with the said gate elements interposed therebetween and with the opposite ends of the said gate elements providing abutments to be engaged by the said pistons to operate the valve; lost motion means interconnecting the said opposed pistons; and fixed abutments within the said housing to limit the sliding movement of one of said gate elements at the opposite ends of its travel, whereby with the positive stopping of the one gate element, the companion element is movable relative thereto in order to laterally displace the two gate elements to effect sealing engagement of both said elements with the valve seats at both ends of the valve travel.

2. A valve of the "through conduit" gate type with fluid pressure means for operating the valve to its open and closed positions, the combination comprising: a pair of double-tapered sliding gate valve elements that are displaceable in a direction normal to that of their sliding movement by relative endwise movement in order to effect sealing engagement between the valve and the seats in both the open and closed positions of the valve; a valve housing which completely encloses the valve and its operating means; the said operating means comprising opposed fluid operated pistons in opposite ends of the housing with the said gate elements interposed therebetween and with the opposite ends of the said elements providing abutments to be engaged by the said pistons to operate the valve; lost motion means interconnecting the said opposed pistons; fixed abutments within the said housing to limit the sliding movement of one of said gate elements at the opposite ends of its travel, whereby with the positive stopping of the one gate element, the companion element is movable relative thereto in order to laterally displace the two gate elements to effect sealing engagement of both said elements with the valve seats at both ends of the valve travel; and fluid pressure control means for selectively energizing the said pistons individually and jointly in the operation of the valve.

3. A valve of the "through conduit" gate type with fluid pressure means for operating the valve to its open and closed positions, the combination comprising: a pair of double-tapered sliding gate valve elements that are displaceable in a direction normal to that of their sliding movement by relative endwise movement in order to effect sealing engagement between the valve and the seats in both the open and closed positions of the valve; a valve housing which completely encloses the valve and its operating means; the said operating means comprising a pair of fluid operated pistons arranged one within the other in each of the opposite ends of the housing with the said gate elements interposed between the pairs and with the opposite ends of said gate elements providing abutments to be engaged by the said pistons, the inner pistons having limited sliding movement independent of the outer surrounding pistons and being positioned to engage only one of said gate elements at the opposite ends thereof; a lost motion connection between the opposed outer pistons; and fixed abutments within the said housing to limit the sliding movement of at least one of said gate elements at stations which correspond to the open and closed positions of the valve, whereby with the stopping of that element by a fixed abutment at either end of its travel, an inner piston is operable to engage the other of said elements and positively displace the two elements expansively, in order to effect the sealing engagement of both elements with the valve seats.

4. A valve of the "through conduit" gate type with fluid pressure means for operating the valve to its open and closed positions, the combination comprising: a pair of double-tapered sliding gate valve elements that are displaceable in a direction normal to that of their sliding movement by relative endwise movement in order to effect sealing engagement with the valve seats in both the open and closed positions of the valve; a valve housing which completely encloses the valve and its operating means; the said operating means comprising a pair of fluid operated pistons arranged one within the other in each of the opposite ends of the housing with the said gate elements interposed between the pairs and with the opposite ends of said gate elements providing abutments to be engaged by the said pistons, the inner pistons having limited sliding movement independent of the outer surrounding pistons and being positioned to engage only one of said gate elements at the opposite ends thereof; a lost motion connection between the opposed outer pistons; fixed abutments within the said housing to limit the sliding movement of at least one of said gate elements at stations which correspond to the open and closed positions of the valve, whereby with the stopping of that element by a fixed abutment at either end of its travel, an inner piston is operable to engage the other of said elements and to positively displace the two elements expansively, in order to effect the sealing engagement of both elements with the valve seats, and the oppositely disposed outer piston is operable in the opposite direction to positively displace the gate elements to relieve them of sealing pressure, in advance of their joint movement toward the other end of their travel.

5. A valve of the "through conduit" gate type with fluid pressure means for operating the valve to its open and closed positions, the combination comprising: a pair of double-tapered sliding gate valve elements that are displaceable in a direction normal to that of their sliding movement by relative endwise movement in order to effect sealing engagement with the valve seats in both the open and closed positions of the valve; a valve housing which completely encloses the valve and its operating means; the said operating means comprising a pair of fluid operated pistons arranged one within the other in each of the opposite ends of the housing with the said gate elements interposed between the pairs and with the opposite ends of said elements providing abutments to be engaged by the said pistons, the inner piston of each pair having limited sliding movement independent of the outer surrounding piston and being positioned to engage only one of said gate elements at the opposite ends thereof; cylinders for the pistons having closed outer ends and inner ends in open communication with the interior of the housing; a limited lost motion connection between the two outer pistons serving to prevent their relative displacement beyond the extent of the lost motion; and fixed abutments within the said housing to limit the sliding movement of at least one of said gate elements at stations which correspond to the open and closed positions of the valve, whereby with the stopping of that element by a fixed abutment at either end of its travel, the inner piston operates to displace the two elements to effect the sealing engagement of both elements with the valve seats.

6. A valve of the gate type with fluid pressure means for positively operating the valve into its open and closed positions, the combination comprising: a two-part sliding valve with a double taper on both parts at their juxtaposed faces whereby relative endwise movement of the parts, in either direction, will change the over-all lateral dimension of the two parts; a valve housing with seats and guides therein, and an abutment at each of the opposite ends thereof forming stops to limit endwise movement of one of said valve parts; the said operating means comprising two pairs of fluid pressure pistons, oppositely disposed, with one pair in each of the opposite ends of the said housing, the pistons being arranged to engage the opposite ends of the valve parts and to exert, when energized, pushing forces on the valve to effect movement thereof to either the open or closed position; each pair of said pistons comprising an outer and an inner piston, the outer one having a lateral dimension that enables it to engage the ends of both parts of the valve, and the inner one being of smaller dimension to engage the opposite ends of only one of the valve parts; and a lost motion connection between the two outer pistons, the extent of this lost motion being at least as great as the permissive amount of relative endwise movement between the two valve parts.

7. The combination as claimed in claim 6 to which is added a means for controlling the fluid pressure to operate the valve, the said means including a control valve by which fluid pressure can be selectively admitted to either pair of the oppositely disposed pistons and to both pairs simultaneously.

8. A valve of the gate type with fluid pressure means for operating the valve to its open and closed positions, the combination comprising: a housing forming a valve chamber having aligned ports provided with opposed parallel valve seats; a ported expansible valve gate mounted for rectilinear movement between said seats to open and close the valve, said gate comprising a pair of double-tapered mutually-wedging elements that are oppositely displaceable in a direction normal to that of their rectilinear movement by relative endwise movement in either direction in order to expand said gate and effect sealing engagement of said elements with said valve seats in both the open and closed positions of the valve; fixed abutments within said housing to limit the rectilinear movement of one of said gate elements at the opposite ends of its travel; fluid-pressure means for engaging and simultaneously moving both said elements in either direction of their travel within limits defined by said fixed abutments; and additional fluid-pressure means for moving the other of said gate elements beyond said limits when said one element is stopped by a said fixed abutment, whereby both said elements are positively displaced expansively at both ends of their travel, in order to effect sealing engagement thereof with said valve seats.

9. A valve of the gate type with fluid pressure means for operating the valve to its open and closed positions, the combination comprising: a housing forming a valve chamber having aligned ports provided with opposed parallel valve seats; a ported expansible valve gate mounted for rectilinear movement between said seats to open and close the valve, said gate comprising a pair of double-tapered mutually wedging elements that are oppositely displaceable in a direction normal to that of their rectilinear movement by relative endwise movement in either direction in order to expand said gate and effect sealing engagement of said elements with said valve seats in both the open and closed positions of the valve; a pair of fluid-operated pistons at each of the opposite ends of said housing with said gate elements interposed between said pairs and with the opposite ends of said elements providing abutments to be engaged by said pistons, one piston of each of said pairs being engageable with only one of said gate elements, and the other piston of each pair being engageable with both of said gate elements; and fixed abutments within said housing to limit the rectilinear movement of the other of said gate elements at the opposite ends of its travel, whereby with the stopping of said other gate element by a fixed abutment at either end of its travel, a said one piston is operable to engage said one gate element and, by moving said one element relative to said other element, to positively displace both of said elements expansively, in order to effect the sealing engagement thereof with said valve seats.

10. The structure defined by claim 9 in which the pistons of each pair are mounted in cylinders having open communication therebetween for the operating fluid.

11. The structure defined by claim 9 including a limited lost motion connection between the pairs of pistons.

12. The structure defined by claim 9 in which said one piston of each pair is arranged within said other piston for limited sliding movement independent thereof.

JESSE S. DOWNS.

REFERENCES CITED

The following references are of record in the file of this patent:

UNITED STATES PATENTS

| Number | Name | Date |
| --- | --- | --- |
| Re. 20,101 | Laurent | Sept. 8, 1936 |
| 430,089 | Sewall | June 10, 1890 |
| 1,819,043 | Sleeper | Aug. 18, 1931 |
| 1,986,429 | Dunham | Jan. 1, 1935 |
| 2,054,259 | Kinzie | Sept. 15, 1936 |
| 2,337,841 | Shafer | Dec. 28, 1943 |

FOREIGN PATENTS

| Number | Country | Date |
| --- | --- | --- |
| 13,828 | Great Britain | June 20, 1903 |

Certificate of Correction

Patent No. 2,478,811                                August 9, 1949

JESSE S. DOWNS

It is hereby certified that errors appear in the printed specification of the above numbered patent requiring correction as follows:

Column 8, line 45, after the word "pressure" insert *responsive*; column 9, lines 11 and 15, after "fluid-pressure" insert *responsive*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*